United States Patent [19]

Charriere

[11] Patent Number: 4,980,214

[45] Date of Patent: Dec. 25, 1990

[54] STRUCTURAL MEMBER WITH HEAT SHRINKABLE OUTER SUPPORT COVERING

[76] Inventor: J. J. Charriere, B.P. 44, 8 Avenue Yver Bapterosses 45250, Briare, France

[21] Appl. No.: 359,149

[22] Filed: May 31, 1989

[30] Foreign Application Priority Data

Jun. 1, 1988 [FR] France .................................. 88 07280

[51] Int. Cl.$^5$ ............................ B32B 1/04; B32B 3/02
[52] U.S. Cl. ........................................ 428/68; 428/71; 428/74; 428/76; 428/73; 428/913; 428/34.9; 428/35.1; 428/37; 428/212; 428/218; 428/138; 264/342 R
[58] Field of Search ........................ 428/68, 71, 74, 76, 428/73, 913, 34.9, 35.1, 37, 212, 218, 138; 264/342 R

[56] References Cited

U.S. PATENT DOCUMENTS

| | | | |
|---|---|---|---|
| 2,160,001 | 5/1939 | Saborsky | 428/68 X |
| 3,149,018 | 9/1964 | Jacobson | 428/68 |
| 4,115,609 | 9/1978 | Denman | 428/68 |
| 4,136,846 | 1/1979 | Brault | 428/73 X |
| 4,194,329 | 3/1980 | Wendt | 52/409 X |
| 4,200,676 | 4/1980 | Caponigro et al. | 428/68 X |
| 4,496,616 | 1/1985 | McLoughlin et al. | 428/34.9 |
| 4,501,779 | 2/1985 | Hsu et al. | 428/34.9 |
| 4,574,099 | 3/1986 | Mixon | 428/76 X |
| 4,624,874 | 11/1986 | Schütze | 428/34.9 |
| 4,690,843 | 9/1987 | Ingagki | 428/34.9 X |
| 4,726,974 | 2/1988 | Nowohilski et al. | 428/76 X |
| 4,851,286 | 7/1989 | Maurice | 428/76 X |
| 4,920,236 | 4/1990 | Makigo et al. | 428/34.9 X |

FOREIGN PATENT DOCUMENTS 0175554  3/1986  European Pat. Off. ............. 428/68

Primary Examiner—Ellis P. Robinson
Assistant Examiner—William P. Watkins
Attorney, Agent, or Firm—Marvin E. Jacobs

[57] ABSTRACT

The composite product consists of a central body is formed of a substance or a material having poor mechanical properties and is in the form of a beam or wedge having a large thickness with respect to width, said central body being is covered, at least over its length by a film or a sheath made of a heat shrinkable plastic shrunk by any suitable heating means after being placed in position around said central body said sheath surrounding the central body is produced by winding thin strips of at least one shrinkable film strip with the adjacent edges of the overlapping strips. The wrapped film can be heat shrunk and the adjacent edge thermally welded by the same heat treatment. The composite and the product can be utilized to produce casing elements for concrete or wedging blocks.

15 Claims, 2 Drawing Sheets

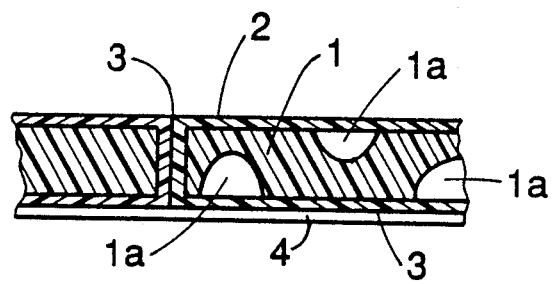
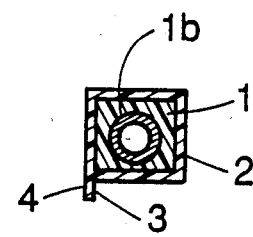
Fig. 1    Fig. 2
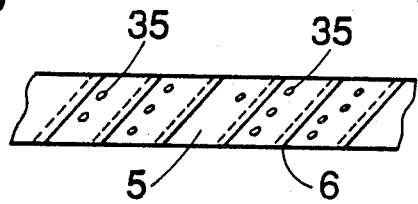
Fig. 3
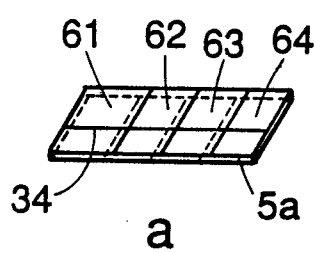  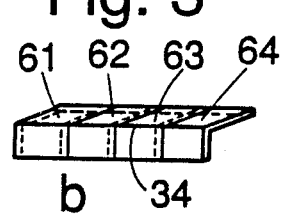  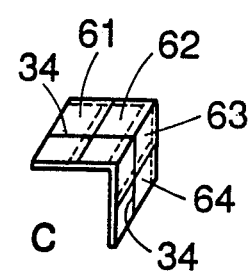
a    b    c
Fig. 4
Fig. 5
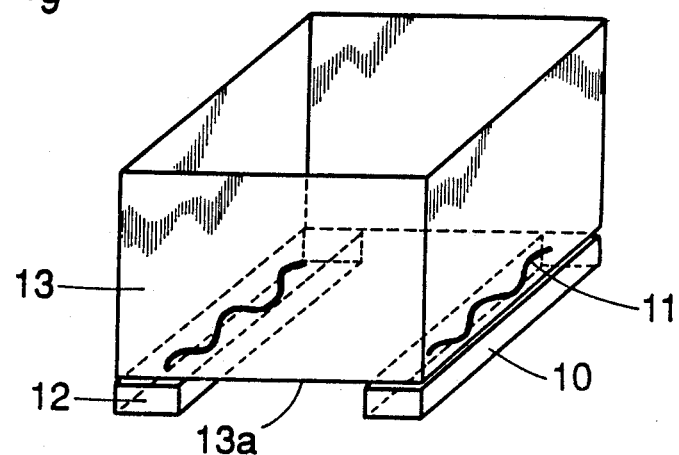
Fig. 6

STRUCTURAL MEMBER WITH HEAT SHRINKABLE OUTER SUPPORT COVERING

The present invention concerns a composite product consisting of a central body made of a substance or a material having poor qualities, for example expanded polystyrene, straw, agglomerated waste products, which is covered, at least over its longest side by a film or a sheath made of plastics retracted or shrunk by any suitable heating means after placing in position, so as to press said substance or material having poor qualities and to confer upon the whole improved mechanical characteristics. The invention also concerns the application of this composite material and/or product in fields such as building, handling and transport.

It is known to produce panels constituted by a low-cost material for use as building materials, for example expanded polystyrene, polyurethane foam, rock wool . . . glued to a single plate or between two plates of pasteboard plaster. To obtain such panels, the gluing is a delicate and long operation requiring large quantities of a special glue. Furthermore, during storage, transport, handling, laying and cutting out of these panels, deformations, deterioration, crumbling and important waste occur.

For other applications, for example casing or lining made of low-cost materials, hollow forms are proposed but are generally so fragile that it is necessary to protect them until they are finally used as mold walls for casting, for example a concrete flooring, by planks in order to prevent any risks of workers or operators passing through them.

Similarly, it is known to statically produce wedge fastenings and stowages using materials such as blocks of expanded polystyrene having poor mechanical quantities. With such wedges, sinking, crumbling and tearing away of these materials is observed as soon as the load moves during transport.

The present invention concerns an economic and reliable solution to these unsolved problems.

For this purpose, according to the invention, the central body is formed as a beam or wedge having a large thickness with respect to the width and the envelope surrounding the central body is produced by winding at least one shrinkable film strip covering the adjacent edges so that these superimposed edges are welded together during retraction heating in order to constitute a continuous axial sheath. The winding easily confers an initial pressing upon the central body in the transverse direction and allows easier initial enveloping of the central body until its passage in a heating furnace which simultaneously provokes shrinking of the envelope film and the formation of a continuous sheath assembly by welding of the superimposed edges.

According to another embodiment of the composite product, the envelope surrounding the central body is made by winding several distinct parallel strips ensuring axial covering of the central body with a welding line common to all the strips and located on one of the faces of the product. The strip(s) of shrinkable film used for enveloping the central body present(s) a shrinking rate in the longitudinal direction which is considerably greater (up to 7 times) than the shrinking rate in the transverse direction. Furthermore, the shrinkable film strip(s) can have a structure modified by crosslinking.

According to another embodiment of the composite product, the envelope surrounding the central body comprises at its ends free portions intended to act as straps for placing in position or securing the central body. The straps advantageously consist of a shrinkable film strip twisted upon itself and subjected to a stretching followed by a shrinking heating carried out at the same time as the shrinking heating of the envelope of the central body, to provide a resistant rope.

According to one particular embodiment of the invention, the envelope surrounding the central body extends by a short length on one of its end faces, so that after its shrinking, the envelope covers the edges and/or the corners of the said end face in order to protect them from wear.

According to one effective embodiment of the invention, the film strip is scattered with small perforations (microperforations) allowing the air which during shrinking is trapped between the strip and the central body and more specially between the superimposed film strips to escape and able to be sealed at least partially by "self welding" after shrinking heating.

According to one particularly suitable embodiment for beams or wedges made of a composite product according to the invention and intended to undergo considerable bending, the film strip(s) is (are) wound in order to form at least two superimposed layers which are treated by heating so that the outer layer shrinks more than the inner layer which thus acts to reduce the friction between the central body and the axial sheath during bending of the composite product.

According to another embodiment, the composite product consists of a central body which has an alveolar structure resulting from embossing or honeycombed shaping of a material or a stacking of corrugated sheets, for example made of cardboard.

In another embodiment, the composite product, the central body has longitudinal and/or transversal recesses.

In an alternative, the composite product consists of a central body that internally comprises at least one metal structure intended to weighten the composite product and to increase its overall mechanical resistance.

According to one practical embodiment, the central body comprises at least one axial or transversal passage intended to cooperate with a steel strip for tying up fixing. In an alternative, the rigid tying up steel strip is forcibly sunk into the central body so as to pass through it axially or transversally.

According to another embodiment of the composite product, the central body comprises on each of its lateral end sides a plate or washer having a shape adapted to this end and maintained on said end by any appropriate means such as gluing, adhesive, nail or pin, after placing the envelope film in position and shrinking it around the central body, so as to reduce the fragility of said end. The plate can comprise a plugging-in tip provided with a central guiding channel for a nail or a fixation screw.

The composite product is used according to the invention to produce casing or lining elements for floors, ceilings, etc. placed in position prior to laying the concrete.

The composite product can be used to produce wedges, round, square or rectangular blocks used in wedging or wedge fastening, covering and handling operations and for constituting a palettizing shoe of a non-punching load.

Other aims, advantages and features of the invention will appear from reading the description of various embodiments of the invention, given by way of non-limitative illustration with reference to the appended drawing in which:

FIG. 1 shows schematically a longitudinal cross-section of the composite product according to the invention and the central body of which is covered by a shrinkable film;

FIG. 2 is a schematic view in transversal cross-section of the composite product represented in FIG. 1;

FIG. 3 is a schematic representation of an embodiment of the composite product according to the invention the central body of which is wrapped round by a shrinkable film strip;

FIGS. 4a to 4c show schematically another embodiment of the composite product according to the invention by illustrating its flexibility;

FIG. 5 shows a transversal cross-section of a composite product according to the invention in which the central body is wrapped by a first metallic film and then a shrinkable film;

FIG. 6 shows in perspective two elements in composite product according to the invention glued to the lower portion of a box or case;

Figure 9:
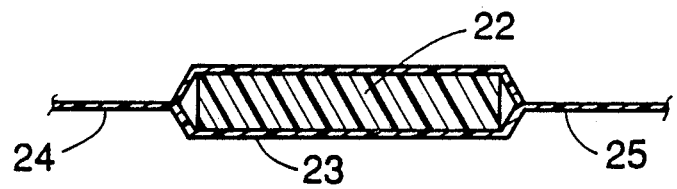
Figure 10:
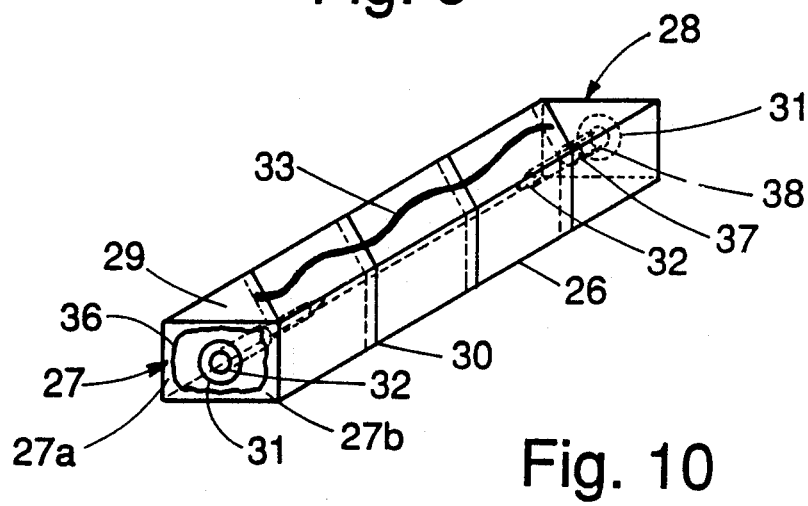

FIG. 9 schematically shows in longitudinal cross-section a composite product according to the invention of which the free ends of the shrinkable film strip can be used as attachment or tying up straps;

FIG. 10 shows in perspective and schematically a composite product according to the invention in the form of a parallepipedic wedge or bar and which is provided, on the one hand with strengthening plates at its ends and on the other hand, on its upper side, with an assembling glue line.

In FIG. 1 is shown a central body 1 the structure of which can be alveolar, resulting for example from expanding a plastic material such as extruded or molded expanded polystyrene or a foaming followed by gelation of one or several components such as polyurethanes, or embossing, or honeycombed shaping of sheets (made of cardboard, for example) or a compacting of diverse waste products such as straw, rushes, wool, etc . . . The central body 1 constitutes an optionally homogeneous volume having for the least poor mechanical qualities, but the lower cost as possible.

The central body 1 can comprise optionally inner, longitudinal and/or transversal recesses made during manufacturing with the aim of economizing material or in order to obtain an even more effective thermal and-/or phonic barrier.

The extreme light weight of the central body can become a drawback, for example in the case where the purpose of the composite product is to manufacture wedges intended for use in open storage sites. In this case, the central body 1 will internally comprise, preferably in the length-wise direction heavy metallic structures such as round irons, tubes, section beams, metallic plates or grids (cf. round tube 1b shown in section in FIG. 2) able to stabilize it against wind and/or to increase its overall mechanical resistance. The central body 1 can be totally or partially surrounded by a metallic grating providing strengthening, protection, and fixation means.

According to a first embodiment known per se, the central body 1 is surrounded by a film 2 made of a material adapted to shrink and which is welded upon itself along an L-shaped line 3. FIG. 2 shows in transversal cross-section the central body 1 surrounded by a film 2 welded on itself in 3. The edges 4 required for welding constitute non active portions of the shrinkable film.

The central body 1 enveloped with film 2 welded on itself, where necessary only closed in position by a light gluing, constitutes an assembly that is subjected to heating by any suitable means: flame or hot air gun, ventilated furnace, tunnel oven. Film 2 is welded entirely at the sites where its edges are superimposed and shrinks on the central body 1 by conferring upon the composite product obtained a cohesion, a considerable improvement of all the mechanical characteristics (compression, traction, bending, shock resistance, rubbing resistance . . . ) an effective protection against environment (contacted products, humidity, radiations, temperatures) as well as facilities for fixation over any base.

FIG. 3 shows a central body 5 produced as formerly described but enveloped film a shrinkable film strip 6 according to the winding technique. The strip 6 is wound in this example with a constant pitch having more or less extensive covering and welded on itself at the moment it shrinks, the portions covered constituting strengthening zones. Film strip 6 is advantageously scattered with small perforations 35 (micro-perforations) allowing the air trapped between the strip 6 and the central body 5 but especially the air trapped between two superimposed film strips 6, to escape. The microperforations are generally sealed by "autowelding" with the underlying film strip during shrinking heating of the film.

The winding of the strip 6 as well as its shrinking can be automatically and continuously carried out without waste or cut offs, the width of the strip 6 being adapted to all the sections (dimensions and configurations) of the central body 5.

Furthermore, by using a strip 6 whose shrinking rate in the longitudinal direction can be seven times greater than the shrinking rate in the transversal direction and provided the structure of the material that constitutes the strip was appropriately modified by reticulation, the whole of the characteristics for the composite product obtained by the winding technique, in particular the resistance to bending, to rubbing, to tearing and resilience are further improved.

By way of example, FIG. 4a represents a composite product whose central body 5a comprises, for example a plate having a width of 100 mm and a thickness of 10 mm in expanded polystyrene having a volumic weight of about 8 Kg/m$^3$, i.e. extremely fragile during bending. After enveloping on an automatic machine by several distinct and parallel shrinkable film strips 61-64 and their shrinking by heat that ensures at the same time welding of the edges with coating in order to constitute a continuous sheath, the composite product easily supports folds, even repetitive folds, at 90° in the longitudinal direction (position b) or in the transversal direction (position c). This property allows it to be used directly as a protective angle steel for packaging or, in a quite different application, to protect the trunks of trees, especially young trees. The winding of the central body by means of distinct parallel strips 61 to 64 is advantageously obtained on a machine comprising several strip rolls disposed in parallel on a support table, so as to ensure the covering of the adjacent edges of the strips and to close the strips on two layers, where necessary. The strips wound flat and no longer helically around the central body 5a are thereafter stopped in position by a simultaneous in line welding of all the strips which is obtained by means of a hot bar pressing against one side of the central body. The winding strips can thus have a shorter length, as in the case of helical winding represented at FIG. 3.

When at least two layers of shrinkable film strips are superimposed either by helicoidal winding, or preferably by winding of parallel strips, and the composite product is thereafter heated in succession with fixation cooling at the furnace outlet, the outer layer shrinks more than the inner layer. When the composite product constituted for example by a central body in expanded very low density (about 8 kg/m³) polystyrene is subjected to bending, the first slightly confined or reduced layer which is in direct contact with the central body thus acts as a lubricating element between the strongly confined or reduced outer envelope and the very elastic central body, in order to facilitate bending of the composite product which can thus more closely assume complex shapes under pressure effect and ensure covering of these shapes.

The shrinkable film can be treated or opacified so as to filter the infra-red and/or ultra-violet radiations harmful to resistance in time of the composite product.

According to another embodiment represented at FIG. 5, the composite product is obtained by enveloping the central body 7 by means of an aluminium alloy strip 8 followed for example by winding a shrinkable film strip 9, the aluminium protecting the central body against heat, fire, radiations and acting where necessary as steam shield or screen while favorizing shrinking of the envelope film. In an alternative, the strips 8 and 9 consist of the same film strip having a 40–50 micrometers thickness and wrapped twice on itself whereby the outside layer is subjected to a higher confining or reduction than the inner layer.

FIG. 6 shows palettization shoes 10 and 12 made of the composite product according to the invention and comprising a gluing line 11 which has, for example, the property of not drying. Shoe 10 is placed on shoe 12, the glued sides upon each other, the shoes thus being delivered in pairs. At the moment of use, shoes 10 and 12 are separated and positioned so that the glued sides are opposite the bottom of the cardboard box 13 to be equipped. It is thus possible to introduce the forks of a pallet transporter or fork-lift truck to displace or transport box 13, the shoes remaining glued on the bottom 13a of the box. Double-sided adhesives can be used instead of a gluing line.

Tests were conducted on palettizing shoes like 10 and 12 in order to compare the known shoes which are not wrapped around according to the invention with the shoes of this invention surrounded with a double layer of a shrinkable film having a thickness of 40 micrometers the outside layer of which being subjected to a shrinking by continuous passage in a furnace followed by a stabilization by cold air blowing.

The palettizing shoes made of a beam having a length of 1 m and a section of 100×100 mm laid on supports at a distance of 0.9 m were subjected to bending by means of a central distributed load extending on a breadth of 0.1 m:

the raw polystyrene beam breaks under a load of 1.0 Kg;

the beam wrapped according to the invention exhibits without breaking a bending deflection of about 0.1 m for a 5 Kg load and supports a 10 Kg load without rupture but with a very important deflection similar to folding.

When the same shoes are disposed for trials under box 13 loaded with 500 Kg, the behaviour of the shoes is as follows:

the raw polystyrene shoes are crushed at 50% of their height and practically no more support the box.

the shoes according to the invention having a double wrapping with a 40 micrometer film and a plain restriction are pressed only at 10% of their original height and remain able to support the load while permitting an easy introduction of the forks of a fork lift truck under the box. Should the box be loaded at 1 ton, it would be sufficient to place four shoes instead of two for always supporting the load.

Figure 7:
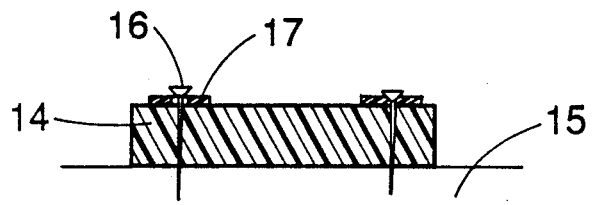
FIG. 7 shows schematically and in longitudinal cross-section a composite product according to the invention secured by means of nails onto a base or support.

FIG. 7 represents in longitudinal cross-section a composite product 14 having a relatively large thickness and fixed onto a flooring 15 by means of nails 16. To avoid damaging the envelope film, if the head of the nail is not wide enough, an intermediary washer 17 made of resilient plastic material having sufficiently wide diameter can be advantageously used which also renders more difficult the tearing away of the whole of the composite product. Nail 16 can be suitably replaced, according to the support upon which it is desired to be fixed, by a pin, a screw, a bolt . . .

Figure 8:
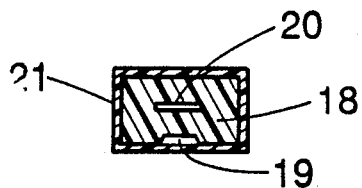
FIG. 8 shows in cross-section a composite product according to the invention comprising positioning passages of a tying up fixing steel strip.

FIG. 8 represents in transversal cross-section a thick central body 18 comprising a groove and/or an internal recess 20 allowing to position the steel strip for tying up fixing. The sheets can be positioned prior to or after winding of the envelope film 21, and prior to or after its shrinking. In an alternative, the rigid steel strip for tying up fixing can be directly sunk through the composite product in the longitudinal or transversal direction.

FIG. 9 represents in longitudinal cross-section a central body 22 in the form of a beam or thick wedge and wound by a film strip 24 which is shrunk on the central body. The ends 24 and 25 of the film strip 23 fully extend over each side of the central body 22 in order to constitute straps. These straps, which are not subjected to shrinking, can for example be knotted above the box which rests upon the composite product, and possibly shrunk in turn in order to obtain a tying up fixing. In order to increase the resistance of the ends 24 and 25 used as tying up straps, it is possible to twist and draw them prior to shrinking by passage in a furnace or oven with the wounded central body 22, 23.

FIG. 10 represents a wedge or a beam 26 constituted by a central body 29 wound with a film strip 30 shrunk on the central body. To strengthen each end 27 and 28, it is possible to cause the film strip 30 to extend in 27a and 27b by a small length over side 2 so that it covers edges or borders of this face according to a curve closed on itself 36 in order to protect them against damage and wear. It is also possible to provide a metallic or plastic plate or washer 31 maintained for example by a nail 32. On the upper face of the wedge is disposed a gluing line 33 allowing fixation of said wedge on a support (not represented). The plate or washer 31 generally comprises a plugging tip 37 integral with the plate and which is provided with a central channel 38 for guiding the nail 32 or an equivalent screw.

The present invention also concerns applications of the composite product to produce panels of suitable thickness placed or integrally secured on a structure, on a wall, on a partition especially made of plaster, disposed inside a door, acting as a thermal or anti-noise screen and/or for protection against the effects of humidity and condensation. It also concerns applications to produce casing elements for floorings placed in position prior to casting concrete. The composite product can be directly used as a wedge or block having any suitable form, especially for wedging, lining, handling, for example to produce palettization shoes directly secured to a case or a box.

The composite product can also be used, in particular in its angle steel form obtained by longitudinal folding of a plane board, as protective covering for angles and trunks, especially trunks of young trees. The composite product according to the invention furthermore satisfies numerous functions formerly carried out by wood since it can be sawn off in the transversal direction and easily nailed while resisting current mechanical aggressions but having considerably lower density and cost than wood.

It will be well understood that the present invention is in no way limited to the embodiments described and represented herein-above and can be adapted to numerous variants available to the man skilled in the art, without departing from the scope and spirit of the invention.

I claim:

1. A composite structural member consisting essentially of a central body in the form of an elongated member comprising material having first mechanical properties in expanded state and second mechanical properties higher than the first mechanical properties in a second compressed state, a sheath covering the central body said sheath consisting essentially of a heat-shrinkable plastic which is shrunk after being wrapped around said central body whereby said material is compressed and the assembly of central body and sheath has improved mechanical characteristics, said sheath containing at least two superimposed layers of heat-shrinkable film, the outer one of said layers being subjected to a more shrinking than the inner one, whereby the inner layer forms a slip member for reducing the friction between the central body and the outer layer during bending of the composite member.

2. A composite structural member according to claim 1, wherein the heat-shrinkable film has a shrinking rate in the longitudinal direction which is higher than the shrinking rate in the transverse direction, thus radially compressing the member.

3. A composite structural member according to claim 1, wherein the sheath surrounding the central body further includes at its ends heat shrunk, free portions extending beyond the central body forming built-in straps to be used for positioning or securing the structural member.

4. A composite structural member according to claim 3, wherein each strap is made of a twisted strip of film which has been subjected to a stretching before heat shrinking whereby the free portion is formed into a twisted rope.

5. A composite structural member according to claim 1, wherein the central body further includes on each lateral side a plate and means securing the plate to said body for reinforcing said body.

6. A composite structural member according to claim 5, wherein the plate includes a plugging-in tip provided with a central guiding channel for receiving a nail or a screw fastener.

7. A composite structural member according to claim 1 in which the material is selected from the group consisting of expended polystyrene, foamed polyurethane, straw or agglomerated waste products.

8. A composite structural member according to claim 1 in which said film is formed of thin strips of heat-shrinkable plastic having overlapping edges which are thermally welded during heat shrinkage of said film.

9. A composite structural member according to claim 8 in which the strips of film are arranged parallel to each other.

10. A composite structural member according to claim 8 in which the strip of film is spirally wound on said central core.

11. A composite structural member consisting essentially of a central body in the form of an elongated beam or wedge formed of lightweight, porous material having first mechanical properties in expanded condition, a sheath covering said central body formed of strips of heat shrinkable plastic placed on the central body with adjacent edges overlapping, said strips being shrunk and said edges thermally welded by heat to form said sheath which compresses the core to form a composite having second higher mechanical properties.

12. A composite structural member in accordance with claim 11 in which the strips are parallel to each other.

13. A composite structural member according to claim 11 in which the strip is continuous and is spirally wound on the central core.

14. A composite structural member according to claim 11 in which the plastic is cross-linked.

15. A composite structural member according to claim 11 in which said strips contain perforations for venting gases during heat shrinking.

* * * * *